United States Patent [19]

Skladzien et al.

[11] 4,346,605
[45] Aug. 31, 1982

[54] MAGNETIC FLOWMETER FOR ELECTRICALLY CONDUCTIVE LIQUID

[75] Inventors: Stanley B. Skladzien, Elmhurst; Donald J. Raue, Naperville, both of Ill.

[73] Assignee: The United States of America as represented by the Department of Energy, Washington, D.C.

[21] Appl. No.: 179,320

[22] Filed: Aug. 18, 1980

[51] Int. Cl.$^3$ .......................... G01F 1/58; G01F 1/64
[52] U.S. Cl. ............................. 73/861.13; 73/861.14; 73/861.15; 73/861.02
[58] Field of Search ........... 73/861.08, 861.11, 861.12, 73/861.13, 861.14, 861.15, 861.16, 861.17, 861.01, 861.02

[56] References Cited

U.S. PATENT DOCUMENTS

| | | | |
|---|---|---|---|
| 2,607,223 | 8/1952 | Fleming | 73/861.15 |
| 2,750,461 | 6/1956 | Bunch | 73/861.11 |
| 3,736,798 | 6/1973 | Wood et al. | 73/861.13 |
| 3,824,456 | 7/1974 | Wiegand | 73/861.11 |
| 3,967,500 | 7/1976 | Forster | 73/861.06 |

FOREIGN PATENT DOCUMENTS

| | | | |
|---|---|---|---|
| 831226 | 3/1960 | United Kingdom | 73/861.11 |
| 1225872 | 3/1971 | United Kingdom | 73/861.11 |
| 241725 | 8/1969 | U.S.S.R. | 73/861.11 |
| 320716 | 12/1971 | U.S.S.R. | 73/861.11 |

Primary Examiner—Kyle L. Howell
Assistant Examiner—David V. Carlson
Attorney, Agent, or Firm—Hugh W. Glenn; Robert J. Fisher; Richard G. Besha

[57] ABSTRACT

A magnetic flowmeter includes first and second tube sections each having walls of non-magnetic material. The first tube is suitably connected to a process for passing a flow of an electrically conductive fluid to be measured. The second tube is established as a reference containing a still medium and is maintained at the same temperature as the first tube. A rotatable magnet assembly is disposed between the two tubes with at least two magnets attached to radially extending arms from a central shaft. Each magnet includes an air gap suitably sized to pass astraddle the diameter along a portion of the length of each of the two tubes. The magnets are provided in matched pairs spaced 180° apart such that signals will be simultaneously generated in signal leads attached to each of the two tubes. By comparing the signals from the two tubes and varying the rotating speed of the magnet assembly until the signals are equal, or attain a maximum, the flow velocity of the fluid within the first tube can be determined. Through temperature monitoring and appropriate heaters, the two tubes are maintained at the same temperature.

9 Claims, 2 Drawing Figures

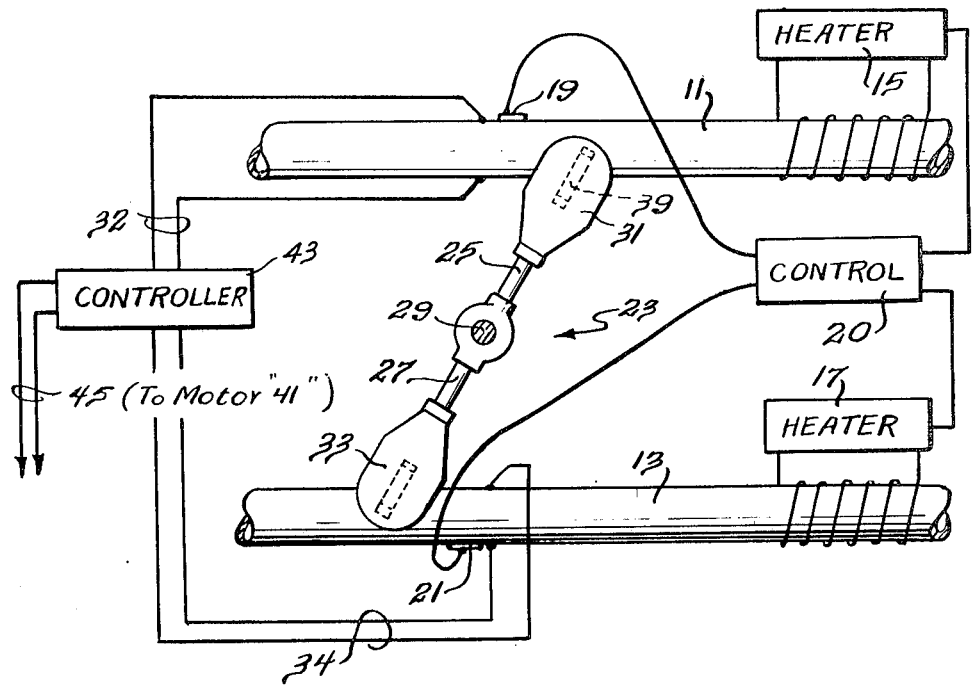
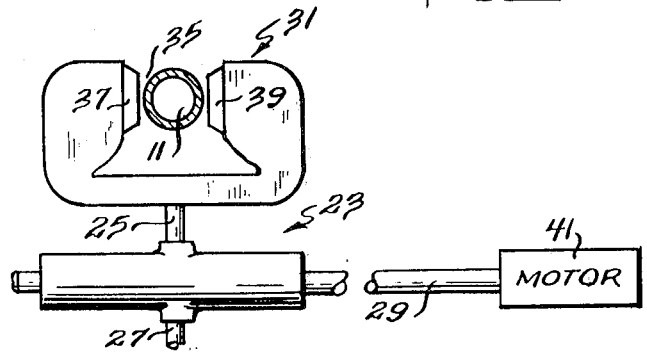

MAGNETIC FLOWMETER FOR ELECTRICALLY CONDUCTIVE LIQUID

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to magnetic flowmeters that employ magnets for determining the flow of electrically conductive liquids, such as liquid metals. Flowmeters of this type permit determination of flow within an unobstructed tube by establishing a magnetic field with lines perpendicular to the direction of the fluid flow. An electrical potential is generated across the flowing electrically conductive fluid that is a determinable function of the fluid velocity.

The tube or channel is of non-magnetic material to prevent interference with the magnetic lines passing through the flowing fluid. Suitable electrical pickup leads are provided on a diameter of the containment tube perpendicular both to the fluid flow and to the lines of the magnetic field. The movement of the electrically conductive fluid through the magnetic field cutting the lines of force develops an electrical potential that is a function of both the velocity of the fluid flow and the strength of the magnetic field. Through measurement of this electrical potential and knowledge of the field strength, the fluid flow can be determined in a calibrated magnetic flowmeter.

Prior magnetic flowmeters have required calibration due to variations in operating temperatures, in pipe wall resistivity and magnetic flux changes. The required calibrations to overcome these changed conditions can be inconvenient and cumbersome particularly when radioactive or hazardous liquids are employed. Such calibrations may be particularly inconvenient and undesirable in large scale processes involving large diameter flow channels.

The following patents and other publications are representative of the general field of the present development.

U.S. Pat. No. 3,967,500 to Forster discloses a magnetic flowmeter that includes first and second probes, one downstream of the other for detecting the A/C and D/C signal components generated by the flow of electrically conductive fluid through a magnetic field. Cross-correlation methods are employed to determine the time delay between the respective A/C signal portions and from that time delay the flow velocity within the flow channel.

U.S. Pat. No. 3,824,456 to Wiegand discloses a magnetic flowmeter in which a fluxgate element is employed to detect the magnetic field developed by the movement of fluid through a steady state magnetic field provided by permanent magnets. Various D/C balancing currents are coupled to the fluxgate to balance out undesired magnetic fields.

U.S. Pat. No. 3,736,798 to Wood et al discloses a probe type magnetic flowmeter for determining fluid flow by measurement of electrical potential developed in the flow of conductive fluid through a magnetic field.

SUMMARY OF THE INVENTION

Therefore, it is an object of the present invention to provide a magnetic flowmeter of improved accuracy.

It is another object to provide a magnetic flowmeter with minimal requirements for recalibration.

It is another object of the present invention to provide a magnetic flowmeter that operates generally independently of temperature changes in the fluid being measured.

Other objects will become apparent in the course of the detailed description of the invention.

In accordance with the present invention, a magnetic flowmeter for an electrically conductive fluid is presented. The flowmeter includes a first tube section with walls of non-magnetic material for passing a flow of electrically conductive fluid. A second tube section of non-magnetic material is disposed parallel to the first section but contains a still medium. Suitable means are provided for producing a revolving magnetic field with at least two diametrically opposed components that synchronously cross the diameters of the two tube sections. The magnetic field moves across the first tube section generally in the direction of the flow of the electrically conductive fluid. Electrical signals generated by the revolving magnetic field passing across the flow of electrically conductive fluid and across the still medium in the second tube section are compared in a controller instrument capable of varying the frequency of the revolving magnetic field until the two electrical signals attain a predetermined relationship, i.e. are equal or reach a combined maximum. The flow of the electrically conductive fluid is then determined from the frequency or angular velocity of the revolving magnetic field.

In a more specific embodiment of the invention, the revolving magnetic field is generated by a rotor assembly having first and second diametrically opposed arms. Each arm has a magnet with an air gap at its end portion. The air gaps are of sufficient width to pass across the diameters of the tube sections as the rotor assembly revolves. The still medium in the second tube section preferably is an electrically insulative fluid such as air. Accuracy with minimum calibration is provided by using a matched pair of magnets at the two rotor arms and by maintaining nearly equal temperature at the two tube sections.

BRIEF DESCRIPTION OF THE DRAWINGS

The present invention is illustrated in the accompanying drawings wherein:

FIG. 1 is a generally schematic view of a magnetic flowmeter for an electrically conductive fluid.

FIG. 2 is a fragmentary view illustrating magnet alignment and a rotor assembly for the flowmeter in FIG. 1.

DETAILED DESCRIPTION OF THE PREFERRED EMBODIMENT

In FIG. 1, a first tube section 11 for passing a flow of electrically conductive fluid is illustrated parallel to a second tube section 13 that is to contain a still medium. The tubes may be side by side or one above the other but are preferably of the same diameter and wall thickness and of the same non-magnetic material, for example of austenitic steel. Other non-magnetic materials such as polymeric plastics might also be selected for use consistent with process conditions. Reference tubing 13 can be a closed length of tubing filled with a still medium selected to produce a suitable reference signal. An electrically insulative fluid such as atmospheric or subatmospheric air is the preferred choice for the still medium but other electrically insulative fluids might also be selected for use as a reference. In an alternative mode of operation as will be discussed below an electrically conductive fluid, such the as process fluid to be measured in tube 11 can be selected as the still medium used as a reference.

Suitable heaters 15 and 17 are shown coupled to each of the tube sections 11 and 13, respectively. The heaters are controlled by instrument 20 that responds to signals from thermocouples 19 and 21 affixed in the tube walls to maintain the two tube sections at near the same temperature. In some applications the heaters 15 coupled to tube section 11 conveying the fluid to be measured can be eliminated as the operation of the present magnetic flowmeter merely requires that the tube sections be at the same temperature rather than at constant temperature.

A rotor assembly 23, also illustrated in FIG. 2, includes first and second radial arms 25 and 27 extending from a central shaft 29. Magnets 31 and 33 are affixed to each of the radial arms. Although magnets 31 and 33 can be electromagnets, they are conveniently selected and illustrated as permanent magnets of a well known magnetic material such as the iron alloy, Alnico. Each of the two magnets includes an air gap 35 defined between pole pieces 37 and 39 of opposite magnetic polarity. The pole pieces straddle and pass across the diameters of the two tube sections 11 and 13 as rotor assembly 23 revolves.

Rotor assembly 23 advantageously is driven by a variable speed motor 41 or other suitable means coupled to shaft 29. The magnetic fields through the air gaps of magnets 31 and 33 simultaneously pass across portions of tube sections 11 and 13 as the pole pieces are revolved into astraddle alignment with the respective tubes. Signal leads 32 and 34 are connected across corresponding diameters of tubes 11 and 13, respectively. The leads can be connected to electrode pick-ups on an inside diameter in contact with the electrically conductive fluid when nonelectrically conductive tube materials such as polymeric materials are selected. However, when an electrically conductive, non-magnetic material such as austenitic stainless steel is used in tubes 11 and 13 the signal leads may be connected directly to the tube at an outside diameter. The signal lead connections define diameters aligned perpendicular to the magnetic lines of force present as the magnet air gaps pass across the tubes. The signal generated across leads 32 of tube section 11 is a function of both the frequency, that is angular velocity of the magnets revolving with the rotor assembly and the velocity of the electrically conductive fluid moving within the tube section. The signal generated in leads 34 from tube section 13 is a function only of the angular velocity of the magnet assembly.

The two electrical signals generated in leads 32 and 34 can be electrically coupled into a suitable controller 43 with indicating or recording capability for varying the speed of motor 41 such as through output leads 45. Where an electrically insulative still medium such as air is used in reference tube section 13, controller 43 typically acts to adjust the speed of motor 41 until the signals across leads 32 and across leads 34 become equal. By driving the rotor assembly 23 and magnets 31 and 33 at a speed at which the signal from tube section 11 is equal and in opposition to the signal from tube section 13, the frequency of the rotor assembly will be directly related to the flow velocity of the electrically conductive fluid in tube section 11. Ideally, the linear velocity of fluid will be equal to the linear velocity of the magnets around the circumference defined by the revolving rotor assembly. The flow rate in tube section 11 can be obtained from the frequency of the rotor assembly, the cross-sectional area of the tube and the known radius between the center of the rotor assembly to the tube section center. This determination remains independent of magnetic field strength and temperature as long as the magnets 31 and 33 are of matched strength and the temperature is the same at the connections of signal leads 32 and of signal leads 34.

In an alternate mode of operation, an electrically conductive fluid such as the fluid whose flow rate is to be measured can be used as the still medium in reference tube section 13. By connecting the signal leads from sections 11 and 13 to controller 43 in opposition, each signal will tend to cancel the other. Thus, when rotor assembly 23 moves along tube 11 at the same velocity as the flow of electrically conductive fluid in that tube, the net signal from the two tube sections will reach a maximum as only the signal component generated in the wall of tube section 11 is available to cancel the signal from tube section 13. The rotor assembly is controlled in this mode to produce a maximum signal at which the frequency of the rotor assembly corresponds to the flow rate of the fluid in tube section 11.

A number of factors are important in the accurate and reproducable operation of the magnetic flowmeter. The magnets are preferably a matched pair with identical or near identical field strength. Temperatures of the two tubing sections at the signal lead connections are preferably controlled to be equal. This is accomplished by monitoring the temperatures with thermocouples 19 and 21 and controlling the temperatures of the tube sections with heaters 15 and 17. In order that tube section 13 will be an accurate reference for comparing the signals from tube section 11, the two sections of piping are preferably of the same composition and dimensionally the same in diameter and wall thickness. The corresponding attachment of the thermocouples to the two tubes and the corresponding attachment of the signal leads preferably are made each respectively in substantially the same manner with the thermocouples located as near as practical to the location of the signal leads on the individual tubes.

It therefore will be seen that the present invention provides a magnetic flowmeter that can operate independently of the temperature of process fluid, tubing and equipment. By using a matched pair of magnets the field strength is substantially eliminated as a variable in flow rate determination. The flowmeter can have particular application in large scale flow channels in which removal from the process or discontinuing operation for further calibration may be extremely inconvenient.

Although the present invention has been described in terms of specific embodiments, it will be clear to those skilled in the art that various changes can be made in the materials, process arrangements and known components within the scope of the following claims.

The embodiments of this invention in which an exclusive property or privilege is claimed are defined as follows:

1. A magnetic flowmeter for an electrically conductive fluid comprising:

a first tube section having walls of non-magnetic material for passing a flow of said electrically conductive fluid;

a second tube section of non-magnetic material parallel to said first tube section but containing a still electrically insulative fluid;

means for producing a revolving magnetic field having at least two diametrically opposed components that synchronously cross the diameters of said first and said second tube sections, said magnetic field moving across said first tube generally in the direction of said flow of electrically conductive fluid;

means for comparing a first electrical signal induced by said revolving magnetic field across said flow of electrically conductive fluid with a second electrical signal induced across said still medium; and means for varying and monitoring the frequency of of said revolving magnetic field to a frequency at which said first and said second electrical signals attain a predetermined relationship whereby the flow of said electrically conductive fluid is determined.

2. The magnetic flowmeter of claim 1 wherein said means for producing said revolving magnetic field comprises a rotor assembly having first and second diametrically opposite radial arms, a magnet having an air gap at the end portion of each of said radial arms, each of said air gaps being of sufficient width to pass across the diameter of said first tube and of said second tube as said rotor assembly revolves.

3. The magnetic flowmeter of claim 2 wherein said magnets on the ends of said first and second opposing radial arms are substantially identical.

4. The magnetic flowmeter of claim 1 wherein means are provided for maintaining said first and second tube sections at equal temperatures.

5. The magnetic flowmeter of claim 1 wherein said first and second tube sections are of substantially the same diameter, wall thickness and composition.

6. The magnetic flowmeter of claim 1 wherein said means for comparing said first and second signals include first and second sets of electrical pickup leads connected to said first and to said second tube sections respectively, each of said set of leads aligned on a diameter substantially perpendicular to the flux lines of the revolving magnetic field passing across the tube diameter.

7. The magnetic flowmeter of claim 1 wherein the means for varying and monitoring the frequency of said rotating magnetic field include a variable speed drive, a rotor assembly coupled to said drive and means for monitoring the speed of said drive.

8. The magnetic flowmeter of claim 1 wherein said still medium is air at atmospheric pressure or below.

9. The magnetic flowmeter of claim 1 wherein said means for varying and monitoring the frequency of said revolving magnetic field controls its frequency to attain equal first and second electrical signals.

* * * * *